(12) United States Patent
Ramachandran (10) Patent No.: US 9,407,925 B2
(45) Date of Patent: Aug. 2, 2016

(54) VIDEO TRANSCODING SYSTEM WITH QUALITY READJUSTMENT BASED ON HIGH SCENE COST DETECTION AND METHOD FOR USE THEREWITH

(75) Inventor: Avinash Ramachandran, Toronto (CA)

(73) Assignee: VIXS Systems, Inc., Toronto (CA)

( * ) Notice: Subject to any disclaimer, the term of this patent is extended or adjusted under 35 U.S.C. 154(b) by 1914 days.

(21) Appl. No.: 12/261,204

(22) Filed: Oct. 30, 2008

(65) Prior Publication Data

US 2010/0111161 A1 May 6, 2010

(51) Int. Cl.
| | |
|---|---|
| *H04N 19/14* | (2014.01) |
| *H04N 19/152* | (2014.01) |
| *H04N 19/40* | (2014.01) |
| *H04N 19/15* | (2014.01) |
| *H04N 19/124* | (2014.01) |
| *H04N 19/126* | (2014.01) |
| *H04N 19/156* | (2014.01) |
| *H04N 19/17* | (2014.01) |
| *H04N 19/115* | (2014.01) |

(52) U.S. Cl.
CPC ............. *H04N 19/40* (2014.11); *H04N 19/124* (2014.11); *H04N 19/126* (2014.11); *H04N 19/15* (2014.11); *H04N 19/152* (2014.11); *H04N 19/156* (2014.11); *H04N 19/17* (2014.11); *H04N 19/115* (2014.11); *H04N 19/14* (2014.11)

(58) Field of Classification Search
USPC ............... 375/240.01, 240.1, 240.12, 240.16, 375/240.26; 348/231, 390.1, 558, 700; 382/107, 168, 172, 239; 386/46, 52, 386/55, 69, 95, 700
See application file for complete search history.

(56) References Cited

U.S. PATENT DOCUMENTS

| 5,801,765 A  * | 9/1998 | Gotoh ................... G11B 27/11 348/155 |
| 6,430,222 B1 * | 8/2002 | Okada ...................... 375/240.03 |
| 6,587,506 B1 * | 7/2003 | Noridomi et al. ........ 375/240.12 |
| 7,031,388 B2 * | 4/2006 | Yang et al. ............... 375/240.16 |
| 2002/0051494 A1 * | 5/2002 | Yamaguchi et al. ..... 375/240.16 |
| 2002/0106024 A1 | 8/2002 | Sato |
| 2005/0122427 A1 * | 6/2005 | Hougui .................. H04N 7/122 348/453 |
| 2005/0169545 A1 * | 8/2005 | Ratakonda ........... H04N 19/107 382/238 |
| 2005/0190841 A1 * | 9/2005 | Sato et al. ................ 375/240.12 |
| 2007/0081587 A1 * | 4/2007 | Raveendran .......... H04N 5/144 375/240.1 |
| 2008/0031337 A1 | 2/2008 | Hasegawa |

FOREIGN PATENT DOCUMENTS

| EP | 1722571 | 11/2006 |
| WO | 2004054158 | 6/2004 |

OTHER PUBLICATIONS

European Patent Office; European Search Report; EP Application No. 09013724.1; Feb. 25, 2014; pp. 1-6.

* cited by examiner

*Primary Examiner* — Michael Thier
*Assistant Examiner* — Prince A Mensah
(74) *Attorney, Agent, or Firm* — Garlick & Markison; Bruce E. Stuckman (57) ABSTRACT

A system for transcoding a video signal into a transcoded video signal, includes a high scene cost detection module that detects a high scene cost corresponding to at least one image of the video signal. An encoder section generates the transcoded video signal, wherein, when the high scene cost is detected, an enhanced quality is assigned to at least one central region.

20 Claims, 7 Drawing Sheets

VIDEO TRANSCODING SYSTEM WITH QUALITY READJUSTMENT BASED ON HIGH SCENE COST DETECTION AND METHOD FOR USE THEREWITH

CROSS REFERENCE TO RELATED PATENTS

None

TECHNICAL FIELD OF THE INVENTION

The present invention relates to video transcoding used in devices such as video processing devices.

DESCRIPTION OF RELATED ART

Video encoding has become an important issue for modern video processing devices. Robust encoding algorithms allow video signals to be transmitted with reduced bandwidth and stored in less memory. Standards have been promulgated for many encoding methods including the H.264 standard that is also referred to as MPEG-4, part 10 or Advanced Video Coding, (AVC). While standards set forth many powerful techniques, further improvements are possible in the performance and the speed of implementation of such methods. Further, the promulgation of multiple formats has led to circumstances where video signals in one format need to be transcoded in another format for use on a particular device, for transmission or for storage. The accuracy of these transcoding methods face the scrutiny of users that are becoming accustomed to higher resolution and better picture quality.

Further limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
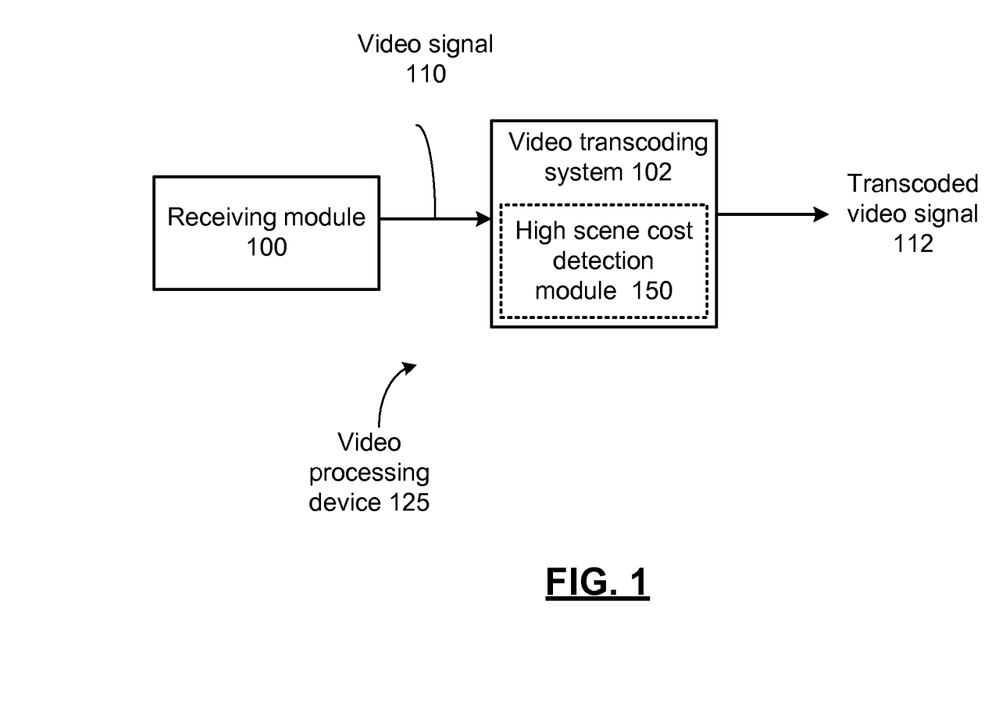
FIG. 1 presents a block diagram representation of a video processing device 125 in accordance with an embodiment of the present invention.

FIG. 1 presents a block diagram representation of a video processing device 125 in accordance with an embodiment of the present invention. In particular, video processing device 125 includes a receiving module 100, such as a set-top box, television receiver, personal computer, cable television receiver, satellite broadcast receiver, broadband modem, 3G transceiver or other information receiver or transceiver that is capable of receiving a video signal 110 from one or more sources such as a broadcast cable system, a broadcast satellite system, the Internet, a digital video disc player, a digital video recorder, or other video source. Video transcoding system 102 is coupled to the receiving module 100 to transcode the video signals 110 to form transcoded video signal 112.

In an embodiment of the present invention, the video signal 110 can include a broadcast video signal, such as a television signal, high definition television signal, enhanced high definition television signal or other broadcast video signal that has been transmitted over a wireless medium, either directly or through one or more satellites or other relay stations or through a cable network, optical network or other transmission network. In addition, the video signal 110 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 and transcoded video signal 112 can each be encoded in accordance with a digital video format such as H.264, MPEG-4 Part 10 Advanced Video Coding (AVC) or other digital format such as a Moving Picture Experts Group (MPEG) format (such as MPEG1, MPEG-2 or MPEG4), Quicktime format, Real Media format, Windows Media Video (WMV) or Audio Video Interleave (AVI), or another digital video format, either standard or proprietary.

The video transcoding system 102 includes a high scene cost detection module 150 that will be described in greater detail in conjunction with many optional functions and features described in conjunction with FIGS. 2-7 that follow.

Figure 2:
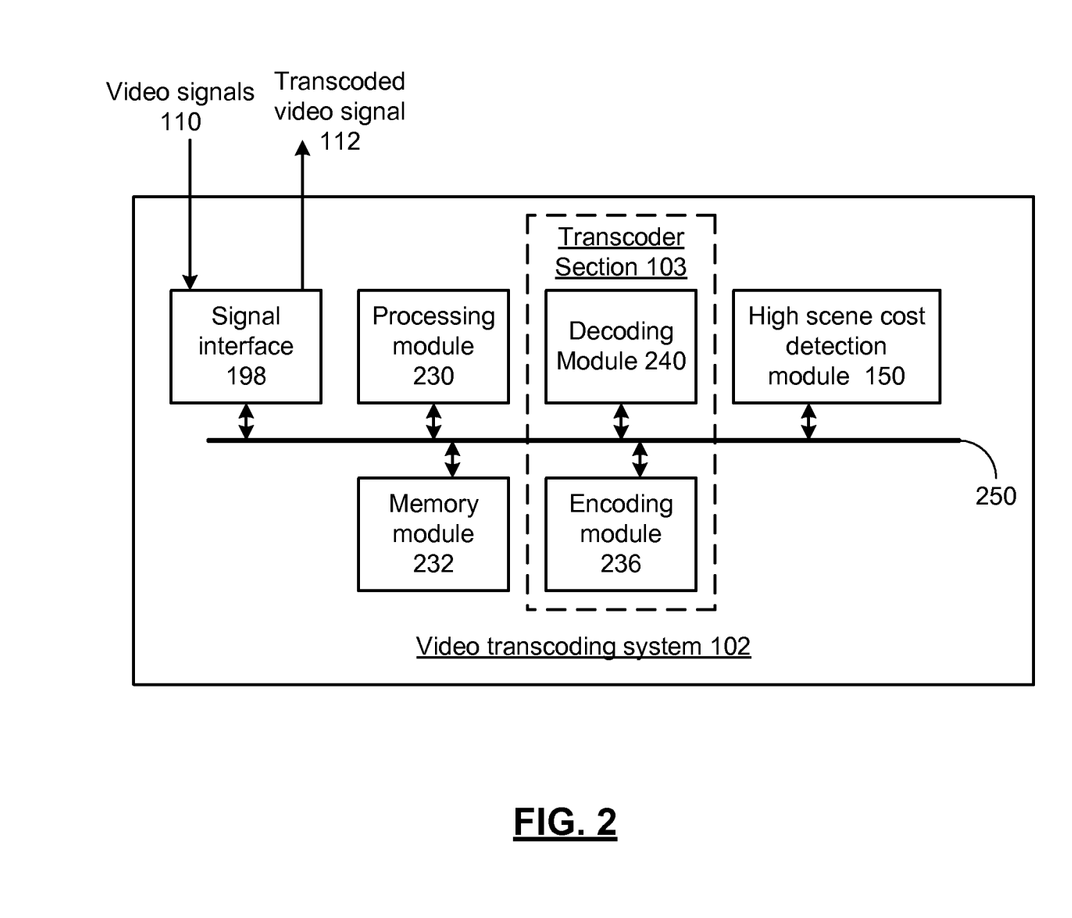
FIG. 2 presents a block diagram representation of a video transcoding system 102 in accordance with an embodiment of the present invention.

FIG. 2 presents a block diagram representation of a video transcoding system 102 in accordance with an embodiment of the present invention. In particular, video transcoding system 102 operates in accordance with many of the functions and features of the H.264 standard, the MPEG-4 standard, VC-1 (SMPTE standard 421M), MPEG-2 or other standard, to transcode video input signals 110 that are received via a signal interface 198 into another digital video format and output as transcoded video signal 112.

The video transcoding system 102 includes an transcoder section 103, signal interface 198, processing module 230, and high scene cost detection module 150. The processing module 230 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 232. Memory module 232 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 230, and memory module 232 are coupled, via bus 250, to the signal interface 198 and a plurality of other modules, such as high scene cost detection module 150, decoding module 240 and encoding module 236. The modules of video transcoding system 102 can be implemented in software, firmware or hardware, depending on the particular implementation of processing module 230. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

Transcoder section 103 can operate by decoding the video signal 110 via decoding module 240 and re-encoding the decoded result via encoding module 236 to produce the transcoded video signal 112. However, decoding module 240 and encoding module 236 can alternatively cooperate to otherwise utilize parameters of the video signal 110 to transform the video signal 110 into a format of transcoded signal 112. In particular similarities between the format of the video signal 110 and the transcoded video signal 112 can be leveraged to reduce the amount of computation required and to avoid a full decoding and re-encoding.

In operation, high scene cost detection module 150 detects a high scene cost in an image, such as a frame or field of video signal 110. Transcoder section 103, when the high scene cost is detected, 103 generates the transcoded video signal 112, with an enhanced quality assigned to at least one central region. Consider an example where the video signal 110 has a scene like flowing and splashing water which can require many more bits to encode than the target bit rate, especially if the scenes lasts for more than a few seconds. Whether the transcoded video signal 112 is a variable bit rate (VBR) or constant bit rate (CBR) signal, the presence of such tough scenes can require special attention to keep the bit rate from deviating too much from a desired or targeted bit rate. In particular, stringent bit allocation constraints could force a large quantization parameter in such scenes, resulting in poor visual quality.

The present invention operates by detecting tough scenes based on high scene cost and by enhancing the quality to one or more central regions of the screen to capitalize on a human visual model that places more importance on the center of the screen. Transcoded signal 112 is generated with more quality emphasis on the center portion of the image, as compared to the peripheral parts. In particular, the quality of a central region of the image can be enhanced even if the tough portion of the image extends into the peripheral portions, outside the central region. By nature, the viewer focuses his or her attention to the middle of the image with enhanced quality. The result can be a transcoded video signal 112 with greater perceived quality for the viewer.

In an embodiment of the present invention, the video signal 110 is an MPEG-2 signal. High scene cost detection module 150 can use encoding parameters such as MPEG-2 based statistics to evaluate the scene cost of an upcoming scene and to detect a potential upcoming high scene cost. Observations derived from actual images indicate that difficult scenes with fairly good quality in MPEG-2 often use many more bits, b, and have higher variance values, var, for some or all of the macroblocks of the image than easy scenes. Quantization step values (QP) also tend to be relatively higher for difficult or tough scenes. A scene cost, C, can be determined by combining these parameters effectively in the form of a function, $f$:

$$C=\eta(b,\text{var},QP)$$

A weighted linear function of these three parameters can be employed, with weighting coefficients chosen to normalize the particular parameters or can be otherwise be generated based on experimental results. Alternatively, a nonlinear function can likewise be employed.

In this example, the high scene cost module 150 operates to detect a high scene cost by comparing the calculated scene cost for an image, such as an MPEG-2 frame of the video signal 110, to a scene cost threshold. If the scene cost compares unfavorably to the scene cost threshold, such as when the scene cost exceeds the threshold, a high scene cost is detected. If the scene cost compares favorably to the scene cost threshold, such as when the scene cost does not exceed the threshold, a high scene cost is not detected (an "easy" scene). The scene cost threshold can also be determined experimentally based on the analysis of actual scenes of differing complexities including some scenes predetermined to be "tough".

Once a high scene cost is detected that corresponds to a particular image, as discussed, the overall visual quality can be enhanced by enhancing the quality of one or more central regions of the image—when compared with other areas outside the central region or regions. In an embodiment of the present invention, the transcoder section 103 adjusts the values of QP to enhance the quality in the central region or regions compared with the periphery of the image. For example, the QP can be lowered in the central region differently for different macroblocks based on the relative difference of the MPEG-2 macroblock QP with the average MPEG-2 QP for that frame. In this example, a QP Reduction factor for the nth macroblock, $QPR_n$, can be found based on:

$$QPR_n=\eta(MQP_n-MQP_{Av})$$

Where, $MQP_n$ is the MPEG-2 based QP for the nth macroblock and $MQP_{Av}$ is an average MPEG-2 QP for the entire image. QP in the areas outside of the central region could be increased, in particular to maintain CBR operation, resulting in diminished quality in these regions. QP in the areas outside of the central region can left unaltered, such is in VBR operation, still with quality that is lower than the enhanced quality of the central region.

In addition, the buffer fullness can be assessed before applying a QP redistribution to enhance visual quality in tough scenes. If the buffer fullness is within limits determined by comparing the buffer fullness to a buffer threshold B, the QP adjustments can be applied. If the buffer fullness compares unfavorably to the buffer threshold, the QP adjustments are not applied. Further, upper limits can optionally be set for the macroblock QP based on the buffer fullness. This dynamic modification of the QP helps maintain quality and also ensures bitrate conformance by taking into consideration buffer fullness. The mechanism of redistribution of QP and thereby bits can be very useful in tough scenes involving splashing or flowing water which invoke bitrate constraints.

Figure 3:
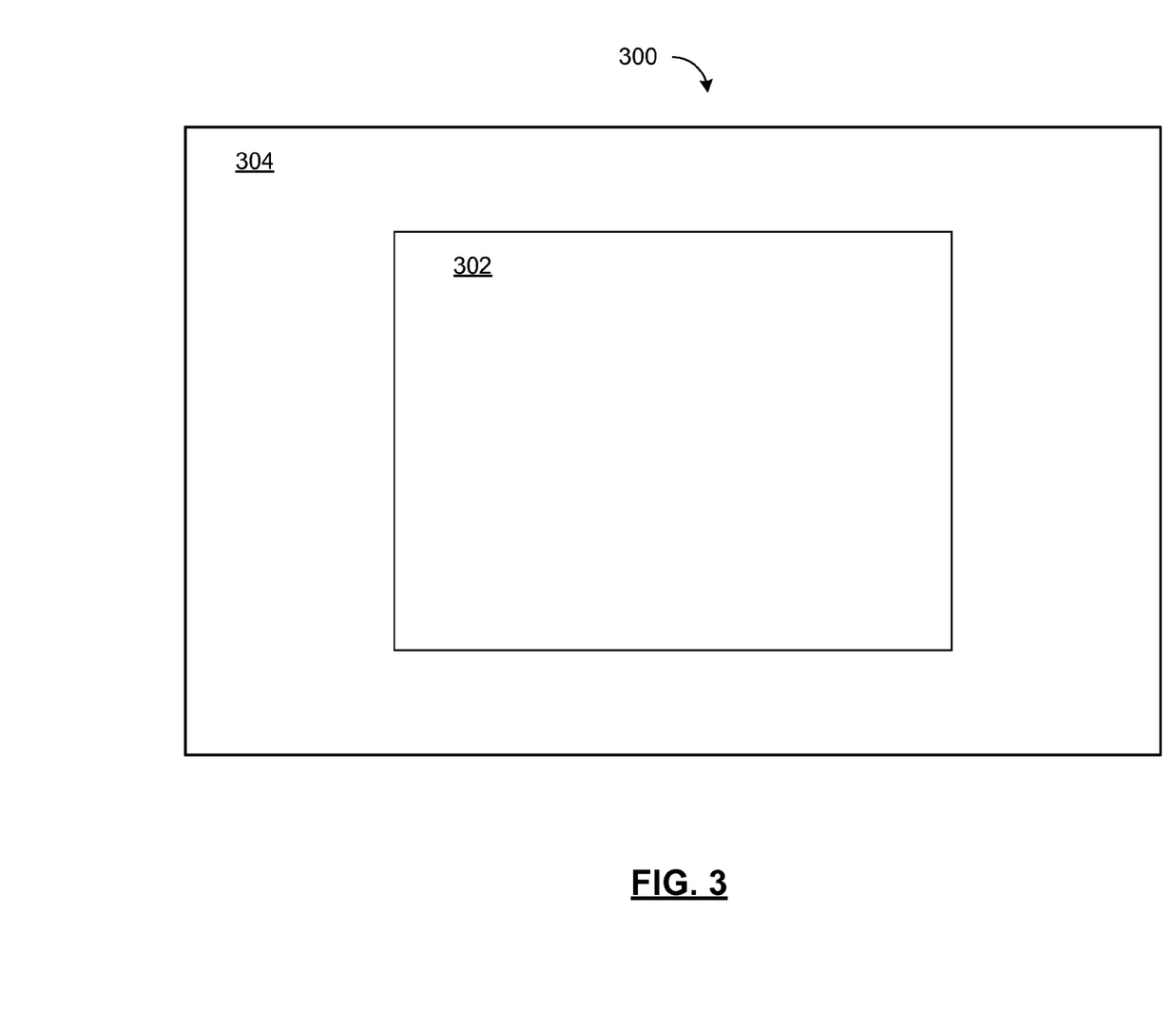
FIG. 3 presents a pictorial representation of an image 300 in accordance with an embodiment of the present invention.

FIG. 3 presents a pictorial representation of an image 300 in accordance with an embodiment of the present invention. In particular, image 300 can be a frame or field of a video signal, such as video signal 110. A region 302 is presented in the center of the frame 300. When a high scene cost is detected, the QP for macroblocks within the region 302 would be lowered relatively as discussed in the various examples presented in conjunction with FIG. 2. As discussed in conjunction with FIG. 2, the QP for macroblocks in the region 304, outside of the region 302, could be unaltered or raised, depending on the implementation. While region 302 is shown as a single rectangular region, multiple regions of variable shapes and sizes can likewise be employed, depending, for instance, on the region or regions that a human eye would generally tend to focus on when viewing pictures or videos, such as video signal 110.

In an embodiment of the present invention, high scene cost detection module 150 can vary the size and or shape of the central region 302. For instance, the size of the central region could also expand and contract with the buffer fullness. If the buffer fullness is within limits determined by comparing the buffer fullness to a buffer threshold B2, a larger central region 302 can be employed. As discussed above, the shape of the central region can further be dynamically adjusted. In an embodiment of the present invention, the central region shape 302 could default to a rectangle, but high scene cost detection module 150 could then eliminate macroblocks with a low variance from the central region. In another embodiment, a morphological operation could be employed to expand or contract the boundaries of the central region 302.

Figure 4:
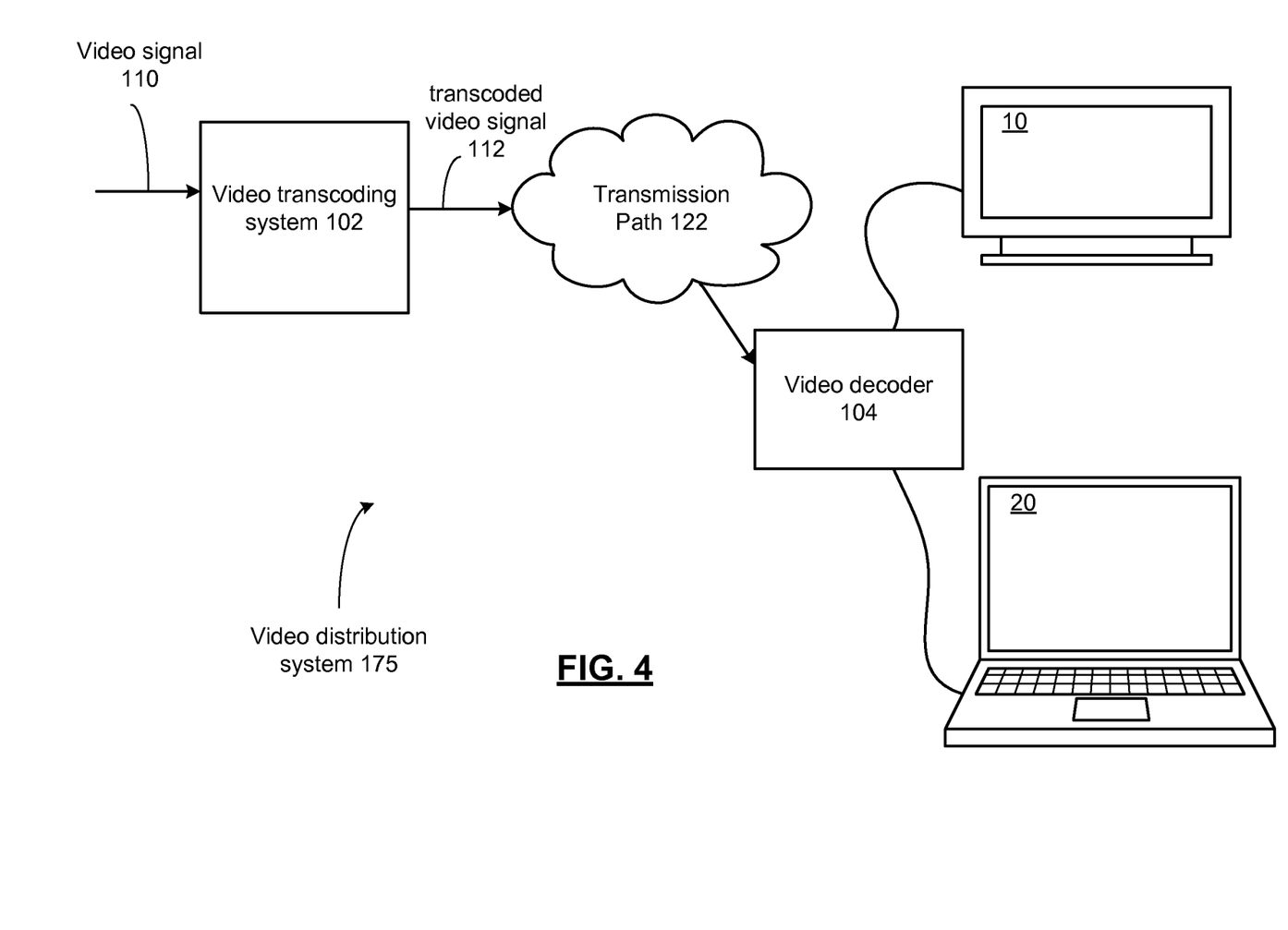
FIG. 4 presents a block diagram representation of a video distribution system 175 in accordance with an embodiment of the present invention.

FIG. 4 presents a block diagram representation of a video distribution system 175 in accordance with an embodiment of the present invention. In particular, transcoded video signal 112 is transmitted via a transmission path 122 to a video decoder 104. Video decoder 104, in turn can operate to decode the transcoded video signal 112 for display on a display device such as television 10, computer 20 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 5:
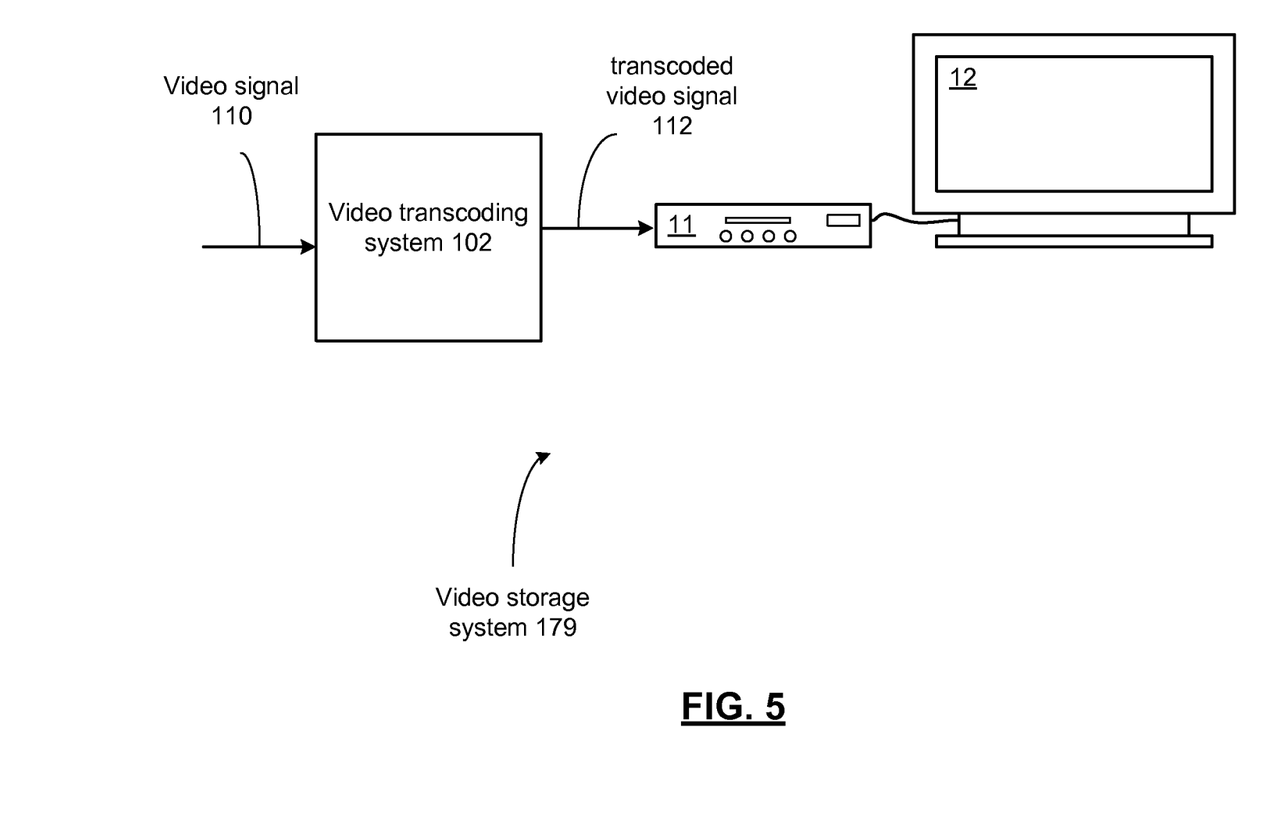
FIG. 5 presents a block diagram representation of a video storage system 179 in accordance with an embodiment of the present invention.

FIG. 5 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the transcoded video signal 112 for display on video display device such as television 12. While video transcoder 102 is shown as a separate device, it can further be incorporated into device 11. While these particular devices are illustrated, video storage system 179 can include a hard drive, flash memory device, computer, DVD burner, or any other device that is capable of generating, storing, decoding and/or displaying the combined video stream 220 in accordance with the methods and systems described in conjunction with the features and functions of the present invention as described herein.

Figure 6:
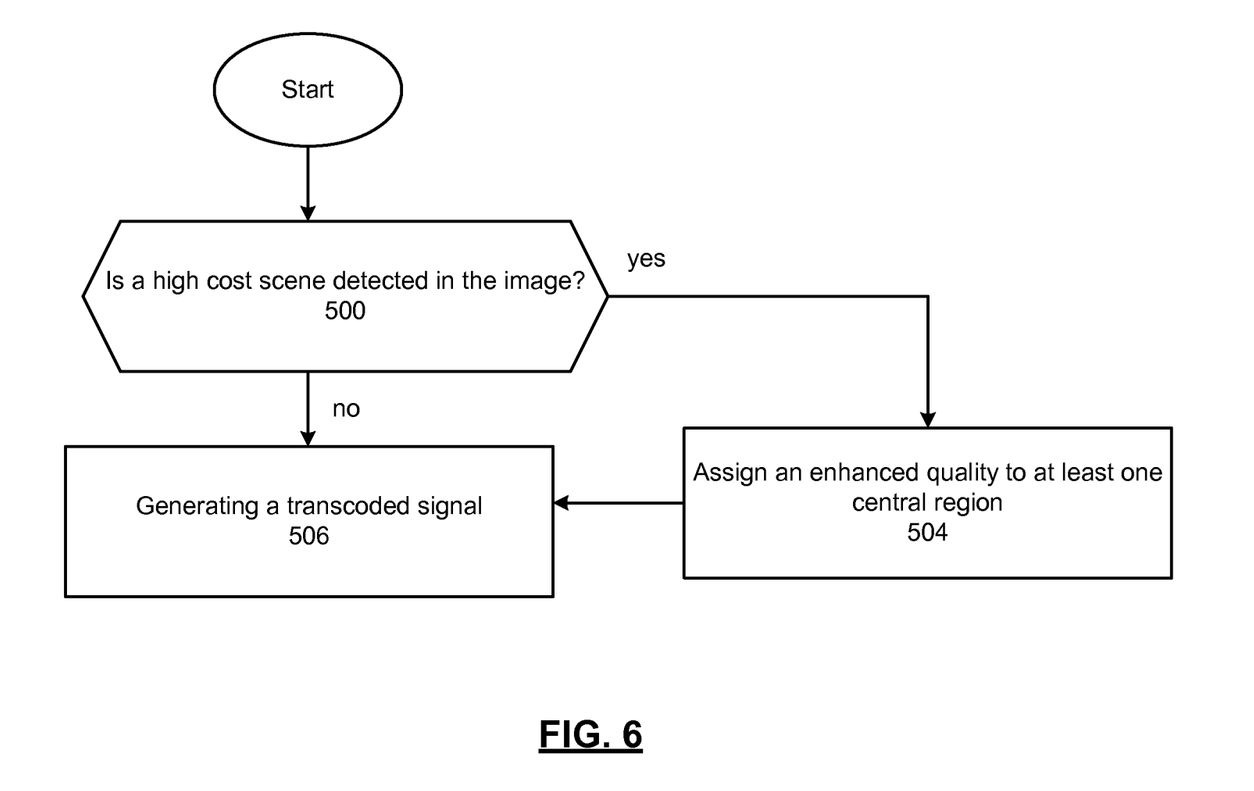
FIG. 6 presents a flowchart representation of a method in accordance with an embodiment of the present invention.

FIG. 6 presents a flowchart representation of a method in accordance with an embodiment of the present invention. In particular a method is presented for use in conjunction with one ore more functions and features described in conjunction with FIGS. 1-5. In step 500, the method determines if a high cost scene is detected in the image. When the high cost scene is detected, an enhanced quality is assigned to at least one central region of the image as shown in step 504 and a transcoded image is generated as shown in step 506.

In an embodiment of the present invention, step 500 includes generating a scene cost based on at least one encoding parameter of video signal. The at least one encoding parameter can include a number of bits used to encode the at least one image, an average variance of a plurality of macroblocks in the at least one image, and/or a quantization step value. Step 500 can further include comparing the scene cost to a scene cost threshold and detecting the high scene cost when the scene cost compares unfavorably to the scene cost threshold.

In an embodiment of the present invention, the transcoded video signal can be a constant bit rate signal and step 504 can assign a diminished quality to regions of the at least one image outside of the at least one central region. Alternatively, the transcoded video signal can be a variable bit rate signal and step 504 can include assigning a quality to regions of the at least one image outside of the at least one central region that is lower than the enhanced quality. The video signal can be a MPEG-2 signal and the transcoded video signal can be an AVC signal.

Figure 7:
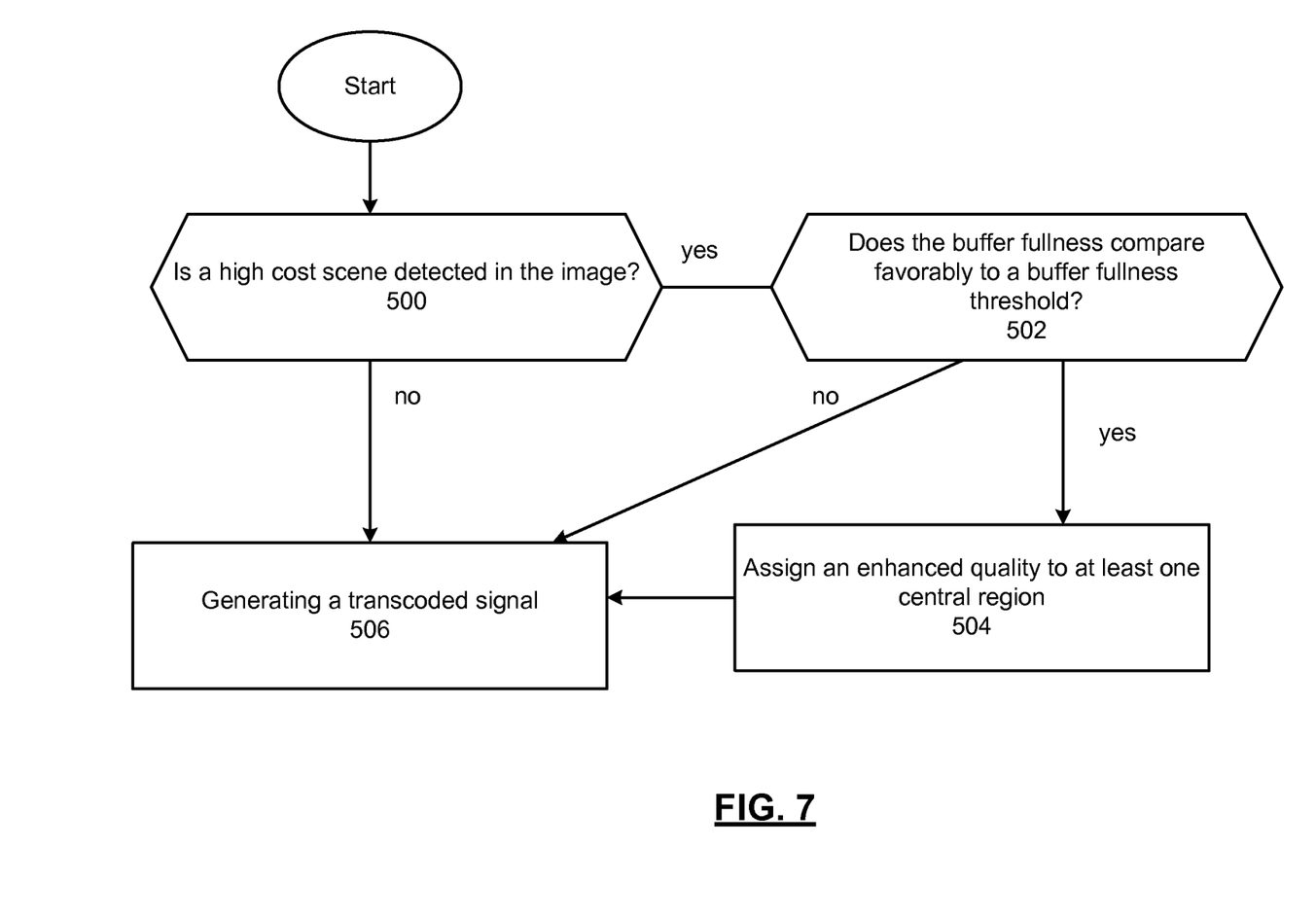
FIG. 7 presents a flowchart representation of a method in accordance with an embodiment of the present invention.

FIG. 7 presents a flowchart representation of a method in accordance with an embodiment of the present invention In particular a method is presented for use in conjunction with one ore more functions and features described in conjunction with FIGS. 1-6. In particular, the method includes common elements of the method of FIG. 6 that are referred to by common reference numerals. This method however, detects when a buffer fullness compares unfavorably to a buffer fullness threshold, as shown in step 502, and step 506 is based on step 504, only when the buffer fullness compares favorably to the buffer fullness threshold.

In preferred embodiments, the various circuit components are implemented using 0.35 micron or smaller CMOS technology. Provided however that other circuit technologies, both integrated or non-integrated, may be used within the broad scope of the present invention.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing a video transcoding coding system and a high scene cost detection module for use therewith. Various embodiments of the present invention hereindescribed have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A system for transcoding a video signal into a transcoded video signal, the video signal including a plurality of images with persistent high scene complexity, the system comprising:
   a high scene cost detection module that detects a high scene cost corresponding to the plurality of images with persistent high scene complexity; and
   an transcoder section, coupled to the high scene cost detection module, that generates the transcoded video signal, wherein, when the high scene cost is detected, an enhanced quality is assigned to at least one central region, wherein the transcoded video signal is a variable bit rate signal and wherein the transcoder section assigns a quality to regions of the at least one image outside of the at least one central region that is lower than the enhanced quality.

2. The system of claim 1 wherein the high scene cost detection module generates a scene cost based on at least one encoding parameter of video signal.

3. The system of claim 2 wherein the at least one encoding parameter includes a number of bits used to encode the plurality of images.

4. The system of claim 2 wherein the at least one encoding parameter includes an average variance of a plurality of macro blocks in the plurality of images.

5. The system of claim 2 wherein the at least one encoding parameter includes a quantization step value.

6. The system of claim 2 wherein the high scene cost detection module compares the scene cost to a scene cost threshold and wherein the high scene cost detection module detects the high scene cost when the scene cost compares unfavorably to the scene cost threshold.

7. The system of claim 1 wherein the transcoder section detects when a buffer fullness compares favorably to a buffer fullness threshold, and the transcorder section assigns the enhanced quality to the central region of the plurality of images only when the buffer fullness compares favorably to the buffer fullness threshold.

8. The system of claim 1 wherein the video signal is a MPEG-2 signal and the transcoded video signal is an AVC signal.

9. A method for transcoding a video signal into a transcoded video signal, the video signal including a plurality of images with persistent high scene complexity, the method comprising:
   detecting a high scene cost corresponding to the plurality of images with persistent high scene complexity; and
   generating the transcoded video signal, wherein, when the high scene cost is detected, an enhanced quality is assigned to at least one central region, wherein the transcoded video signal is a variable bit rate signal and wherein generating the transcoded video signal assigns a quality to regions of the at least one image outside of the at least one central region that is lower than the enhanced quality.

10. The method of claim 9 wherein detecting the high scene cost includes generating a scene cost based on at least one encoding parameter of video signal.

11. The method of claim 10 wherein the at least one encoding parameter includes a number of bits used to encode the plurality of images.

12. The method of claim 10 wherein the at least one encoding parameter includes an average variance of a plurality of macro blocks in the plurality of images.

13. The method of claim 10 wherein the at least one encoding parameter includes a quantization step value.

14. The method of claim 10 wherein detecting the high scene cost includes comparing the scene cost to a scene cost threshold and detecting the high scene cost when the scene cost compares unfavorably to the scene cost threshold.

15. The method of claim 9 further comprising:
   detecting when a buffer fullness compares favorably to a buffer fullness threshold;
   wherein generating the transcoded video signal includes assigning the enhanced quality to the central region of the plurality of images only when the buffer fullness compares unfavorably to the buffer fullness threshold.

16. The method of claim 9 wherein the video signal is a MPEG-2 signal and the transcoded video signal is an AVC signal.

17. A system for transcoding a video signal into a transcoded video signal, the video signal including a plurality of images with persistent high scene complexity, the system comprising:
   a high scene cost detection module that detects a high scene cost corresponding to the plurality of images with persistent high scene complexity; and
   an transcoder section, coupled to the high scene cost detection module, that generates the transcoded video signal, wherein, when the high scene cost is detected, an enhanced quality is assigned to at least one central region, wherein the transcoded video signal is a constant bit rate signal and wherein the transcoder section assigns a diminished quality to regions of the at least one image outside of the at least one central region.

18. The system of claim 17 wherein the high scene cost detection module generates a scene cost based on at least one encoding parameter of video signal.

19. The system of claim 18 wherein the at least one encoding parameter includes at least one of: a number of bits used to encode the at least one image, an average variance of a plurality of macro blocks in the at least one image, or a quantization step value.

20. The system of claim 18 wherein the high scene cost detection module compares the scene cost to a scene cost threshold and wherein the high scene cost detection module detects the high scene cost when the scene cost compares unfavorably to the scene cost threshold.

* * * * *